(12) United States Patent
Campanelli et al.

(10) Patent No.: US 11,693,394 B2
(45) Date of Patent: Jul. 4, 2023

(54) SYSTEMS AND METHODS FOR AUTOMATED PREDICTION OF MACHINING WORKFLOW IN COMPUTER AIDED MANUFACTURING

(71) Applicant: D.P. TECHNOLOGY CORP., Camarillo, CA (US)

(72) Inventors: Tania Campanelli, Fano (IT); Daniele Spitaletta, Pistoia (IT); Luigi Galavotti, Florence (IT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 97 days.

(21) Appl. No.: 17/191,386

(22) Filed: Mar. 3, 2021

(65) Prior Publication Data

US 2021/0278822 A1 Sep. 9, 2021

Related U.S. Application Data

(60) Provisional application No. 62/984,755, filed on Mar. 3, 2020.

(51) Int. Cl.
G05B 19/418 (2006.01)

(52) U.S. Cl.
CPC ..... *G05B 19/4188* (2013.01); *G05B 19/4183* (2013.01); *G05B 19/41815* (2013.01); *G05B 19/41865* (2013.01)

(58) Field of Classification Search
CPC .......... G05B 19/4188; G05B 19/41815; G05B 19/4183; G05B 19/41865; G05B 2219/35086; G05B 2219/35095; G05B 2219/35167; G05B 2219/35172; G05B 2219/35215; G05B 2219/36284; G05B 2219/36289; G05B 2219/36307; G05B 19/40937; G05B 19/4097; Y02P 90/02
See application file for complete search history.

(56) References Cited

U.S. PATENT DOCUMENTS

| | | | | |
|---|---|---|---|---|
| 2001/0000805 A1* | 5/2001 | Kadono | ............. | G05B 19/4097 700/98 |
| 2008/0255684 A1* | 10/2008 | Wong | ................. | G05B 13/0285 700/173 |
| 2009/0112354 A1* | 4/2009 | El-Wardany | .......... | F01D 5/3084 29/889.23 |
| 2014/0180465 A1* | 6/2014 | Nakano | .............. | G05B 19/4097 700/160 |
| 2019/0018391 A1* | 1/2019 | Rogers | ............... | G05B 19/4097 |

* cited by examiner

*Primary Examiner* — Christopher E. Everett
(74) *Attorney, Agent, or Firm* — Concept IP LLP; Pejman Yedidsion

(57) ABSTRACT

Systems, devices, and methods including selecting one or more sequences of machining types for a feature of one or more features, where the selection of the one or more sequences of machining types is based on the feature and a database of prior selections of machining types; selecting one or more tools for the selected one or more sequences of machining types, where the selection of the one or more tools is based on the feature, the selected one or more sequences of machining types, and a database of prior selections of one or more tools; and selecting one or more machining parameters for the selected one or more tools, where the selected machining parameters are based on the feature, the selected one or more sequences of machining types, the selected one or more tools, and a database of prior selections of one or more machining parameters.

17 Claims, 11 Drawing Sheets

SYSTEMS AND METHODS FOR AUTOMATED PREDICTION OF MACHINING WORKFLOW IN COMPUTER AIDED MANUFACTURING

CROSS-REFERENCE TO RELATED APPLICATIONS

This application claims priority to and the benefit of U.S. Provisional Patent Application No. 62/984,755, filed Mar. 3, 2020, the contents of which are hereby incorporated by reference herein for all purposes.

TECHNICAL FIELD

Embodiments relate generally to machining processes in manufacturing, and more particularly to automated prediction of a customized programming workflow for manufacturing machinery in a computer aided manufacturing (CAM) environment based on a user's habits, environment, and skill set.

BACKGROUND

Computer aided manufacturing (CAM) software systems are used to program computer numerical control (CNC) machine tools that are used in machine shops for the production of discrete parts, such as molds, dies, tools, prototypes, aerospace components and more.

CNC machine tools run a machining program that executes a series of instructions that are steps for the manufacturing of a part. These CNC machine tools execute a machining program with no knowledge of the context. Execution of the program is user dependent and may have at each point of the process one of several possible variations or options. Accordingly, multiple permutations and/or combinations may be formed at teach step based on previously selected options and features of the machine.

SUMMARY

A method embodiment may include: selecting one or more sequences of machining types for a feature of one or more features, where the selection of the one or more sequences of machining types may be based on the feature and a database of prior selections of machining types; selecting one or more tools associated with the selected one or more sequences of machining types, where the selection of the one or more tools may be based on the feature, the selected one or more sequences of machining types, and a database of prior selections of one or more tools; determining one or more machining parameters for the selected one or more tools, where the determined machining parameters are based on the feature, the selected one or more sequences of machining types, the selected one or more tools, and a database of prior determinations of one or more machining parameters; and determining a machining workflow prediction in a computer aided manufacturing (CAM) environment based on the selected one or more sequences of machining types, the selected one or more tools, and determined one or more machining parameters.

In additional method embodiments, the determined one or more machining parameters comprise at least one of: speed, feed rate, and motion pattern. Additional method embodiments may include: determining more accurate machining workflow prediction in comparison to a set of previous predictions based on the execution of more models. Additional method embodiments may include: assigning a weight to a previous prediction of the set of previous predictions.

Additional method embodiments may include: determining a set of user preferences; and associating the determined set of user preferences with machining tools. In additional method embodiments, determining a machining workflow prediction may be based on determining energy-efficient toolpath having least number of movements, cutting operations, and cutting time, thereby reducing unneeded movements and cycle time combined with shortened tool lengths. In additional method embodiments, the database comprises historical data collected over a period of time.

In additional method embodiments, selecting one or more sequences of machining types may be further based on a user's history of machining a pocket for the machine tool. In additional method embodiments, the determined machining workflow prediction comprises predicted parameters for a tool; where the predicted parameters for a tool include at least one of: a tool style, a tool diameter, a cutting length, a shank diameter, and a tool radius. In additional method embodiments, the determined machining workflow prediction may be transmitted to a user interface at the Computer aided manufacturing (CAM) used to program computer numerical control (CNC) machine for implementation by a user.

A system embodiment may include: an Operation Sequence Classifier Component having a processor and addressable memory, where the Operation Sequence Classifier Component may be configured to select one or more sequences of operations for each feature of one or more features; a Tool Parameters Predictor Component having a processor and addressable memory, where the Tool Parameters Predictor Component may be configured to: receive the selected one or more sequences of operations, each feature of the one or more features, and one or more prior tool parameters; and select one or more tool parameters based on the received selected one or more sequences of operations, each feature of the one or more features, and the one or more prior tool parameters; an Operation Parameter Predictor Component having a processor and addressable memory, where the Operation Parameter Predictor Component may be configured to: receive the selected one or more sequences of operations, the one or more prior tool parameters, each feature of the one or more features, the one or more prior tool parameters, and the selected one or more tool parameters; and determine one or more operation parameters based on the received selected one or more sequences of operations, the one or more prior tool parameters, each feature of the one or more features, the one or more prior tool parameters, and the selected one or more tool parameters.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
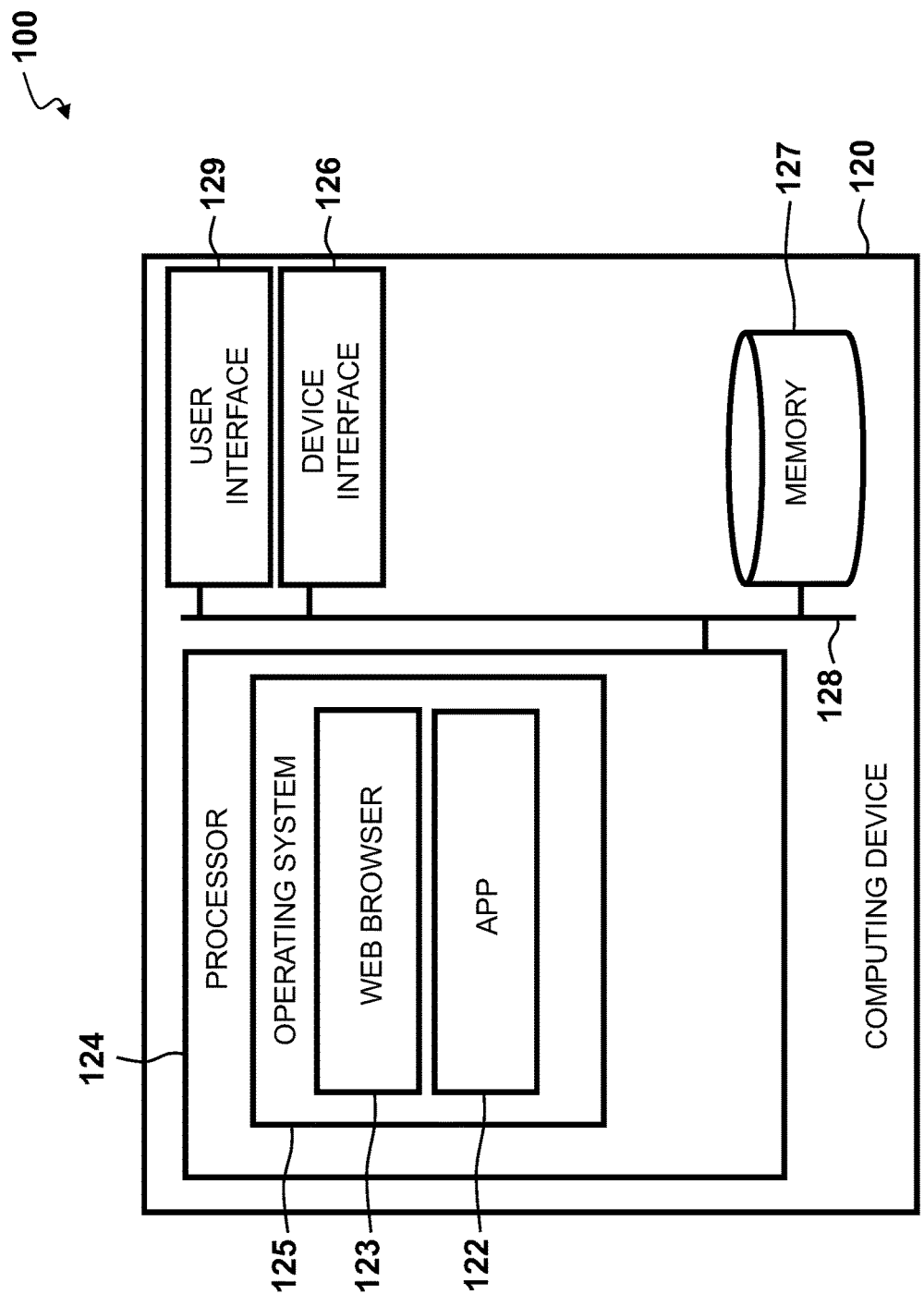
FIG. 1 depicts a top-level functional block diagram of a computing device system in a computer aided manufacturing (CAM) environment.

The described technology concerns one or more methods, systems, apparatuses, and mediums storing processor-executable process steps of automatic recommendation of an efficient programming workflow of machining for a user for manufacturing machinery in a computer aided manufacturing (CAM) environment. CAM software systems may be used to program computer numerical control (CNC) machine tools. The CNC machine tools may be used in machine shops for the production of discrete parts such as molds, dies, tools, prototypes, aerospace components and more. The techniques introduced below may be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

FIGS. 1-11 and the following discussion provide a brief, general description of a suitable computing environment in which aspects of the described technology may be implemented. Although not required, aspects of the technology may be described herein in the general context of computer-executable instructions, such as routines executed by a general—or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time and, in some implementations, the data may be provided on any analog or digital network (e.g., packet-switched, circuit-switched, or other scheme).

The described technology may also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions may reside on a client computer (e.g., PC, mobile computer, tablet, or smart phone). Data structures and transmission of data particular to aspects of the technology are also encompassed within the scope of the described technology.

With respect to FIG. 1, an example of a top-level functional block diagram of a computing device system 100 is illustrated. The system 100 is shown as a computing device 120 comprising a processor 124, such as a central processing unit (CPU), addressable memory 127, an external device interface 126, e.g., an optional universal serial bus port and related processing, and/or an Ethernet port and related processing, and an optional user interface 129, e.g., an array of status lights and one or more toggle switches, and/or a display, and/or a keyboard and/or a pointer-mouse system and/or a touch screen. Optionally, the addressable memory may include any type of computer-readable media that can store data accessible by the computing device 120, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet. These elements may be in communication with one another via a data bus 128.

In some embodiments, via an operating system 125 such as one supporting a web browser 123 and applications 122, the processor 124 may be configured to execute steps of a process for of automatic recommendation of the most efficient programming workflow of machining for a user for manufacturing machinery in a CAM environment. That is, efficiently programing of machine operations and production of discrete parts need to be cost efficient, time efficient, and/or energy efficient to increase throughput with consistent quality. This may be achieved by, for example, determining energy-efficient toolpath having least number of movements, cutting operations, and cutting time, while reducing unneeded movements and cycle time combined with shortened tool lengths. Another example of efficiently programming of machine operations may be to run operations continuously with maximum feed and rapid rates. Other examples, include utilizing fast speed which reduces cycle times in tasks, such as moving the spindle home for changing tools and then positioning the cutting tool precisely where it needs be prior to cutting. In yet another example, cutting feed and efficiency may depend on several factors, such as part material, tool, path, and depth of cut as determined from prior operations using the same machine and honed, refined, or enhanced to become more efficient over a period of time and running such operations based on the user's experience level.

The system 100 provides for intelligently automating machine operations and production of discrete parts, such as molds, dies, tools, prototypes, aerospace components and more. More specifically, the system 100 may incorporate machine learning, where artificial intelligence (AI) allows the system 100 the ability to automatically learn and improve from experience without requiring explicit programming. In embodiments implementing machine learning, the system may access data, e.g., historical data, that may have been collected over a period of time and use said collected data to learn without further input from users. As such, the system 100 may be continually learning and improving based on the ongoing collection of data. In one embodiment, the system 100 may 'learn' how a user is using a product, such as how the user is determining to manufacture a geometrical feature of a machine part. The system 100 may learn how to automatically propose the same choices that the user would make on a particular geometry feature, based on a specific user workflow, skill set, and set of experiences. A feature, in computer-aided design (CAD), may refer to a region of a part with some important geometric or topological properties, and may sometimes be referred to as form features. Form features may include both shape information and parametric information of a region of interest. The system 100 may be based on machine learning algorithms, including an artificial neural network (ANN), X-GBoost, decision trees, genetic algorithms, and the like, in order to learn how to automatically recommend the most efficient programming workflow of machining for the user.

Figure 2:
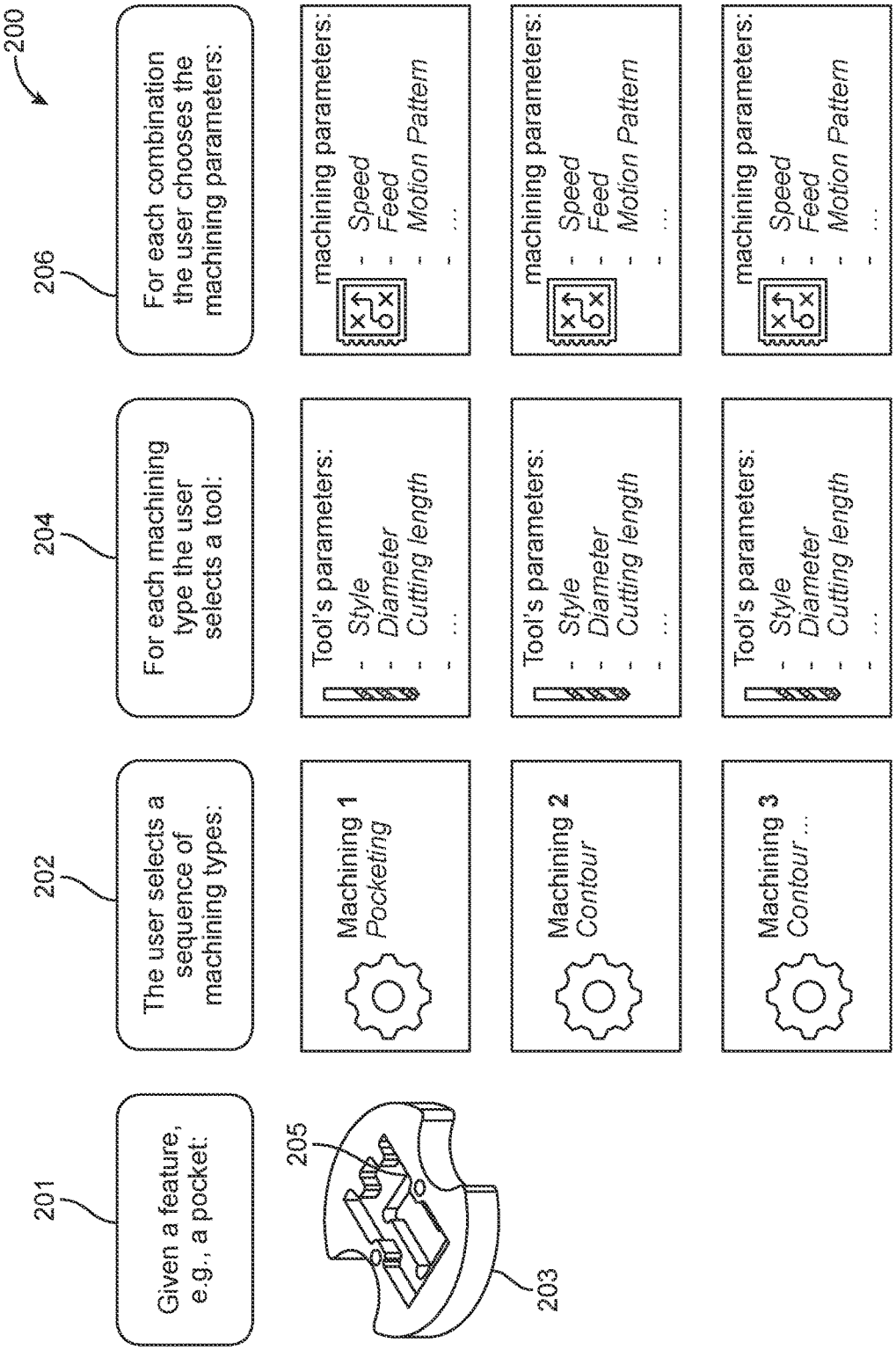
FIG. 2 depicts an example workflow for learning of a user decision making process for machining a feature in the CAM environment of FIG. 1.

With respect to FIG. 2, workflow 200 for learning of a user decision making process for machining a part in a CAM environment is illustrated. At an initial step, step 201, a user may be given a target part 203, which may have a pocket 205 with a specified geometry. Given the pocket 205 (also referred to as a feature), a user may manually select a sequence of machining types, at step 202. More specifically, the user may decide to first select a pocketing machining type, then a contour machining type, and finally another contour machining type, and so on. Other machining types and different sequences of the same machining types are possible and contemplated. For example, another machining type, in addition to the above, may include a hole machining type. In one embodiment, machining types and sequences depend on the user skill set and experiential habits. The user may then select a tool for cutting the pocket 205. The user may then select a tool for each machining type (selected at step 202) at a subsequent step, step 204. The tool may have a plurality of parameters that the user manually chooses from, such as the style of tool, the diameter of the tool, and the cutting length of the tool. For example, the user may first select an end mill tool, and then select the diameter of the end mill, as well as the cutting length of the end mill. In one example, the user may first decide to use a large tool (e.g., a large end mill diameter) and then fine-tune the feature with a smaller tool as compared to the previously used tool (e.g., a smaller end mill). In another example, the user may prefer to begin with a smaller tool (e.g., a smaller end mill). The selected tool parameters 204 may be different based on the choice of a large initial tool or a small initial tool. In another example, for machining a pocket feature (e.g., pocket 205), a user may first select a pocket cycle with a "chamfer" tool. The user may then select the diameter of the chamfer tool, as well as the cutting length, style, and shank parameters of the chamfer tool. In one embodiment, the system may determine a set of user preferences and associate the preferences with machining tools and/or comfort levels exhibited by the user.

Continuing on at step 206, the user may choose the machining parameters for machining the feature (e.g., the pocket 205) with the machining tool selected at step 204. The machining parameters may include speed, feed rate, motion pattern, and the like. The machining parameters presented for selection by the user are related to the selections made by the user at steps 202 and 204. For example, for the same pocket 205, with the same exact geometry, there may be a different set of associated machining parameters, with the machining parameters presented being based on the decisions taken by the user during the previous steps, such as steps 202 and 204.

In another embodiment, the machining parameters may be dynamically updated, and the outputs to the user may change based upon the data history. For example, and in one embodiment, the system may learn based on a user's initial data set, e.g., a user's training set; however, in order to continue learning, the system may require new data, such as new machining test files. Additionally, the system may continue learning until the user prompts the system to use the new data. In another embodiment, the system may automatically incorporate the new data from the user and continue to learn based on the newly added data. In one example, if the accuracy calculated by the system is not matching the user's expectancy, then the user may add new data and thereafter, the system may retrain itself. As such, the system would be more "continuous" in dynamically retraining itself and not require a user to prompt the system to begin retraining itself. Therefore, if there is a change to the training set, the system may automatically incorporate that change and retrain the system based on the user's data history and the new change to the data set.

In another embodiment, the feature may be a hole as opposed to a pocket. As described above, the machining parameters may include speed, feed rate, motion pattern, and the like. Again, the machining parameters presented for selection by the user are related to the selections made by the user at steps 202 and 204. For example, for the same hole, with the same exact geometry there may be a different set of associated machining parameters, with the machining parameters presented being based on the decisions taken by the user during the previous steps, such as steps 202 and 204.

Figure 3:
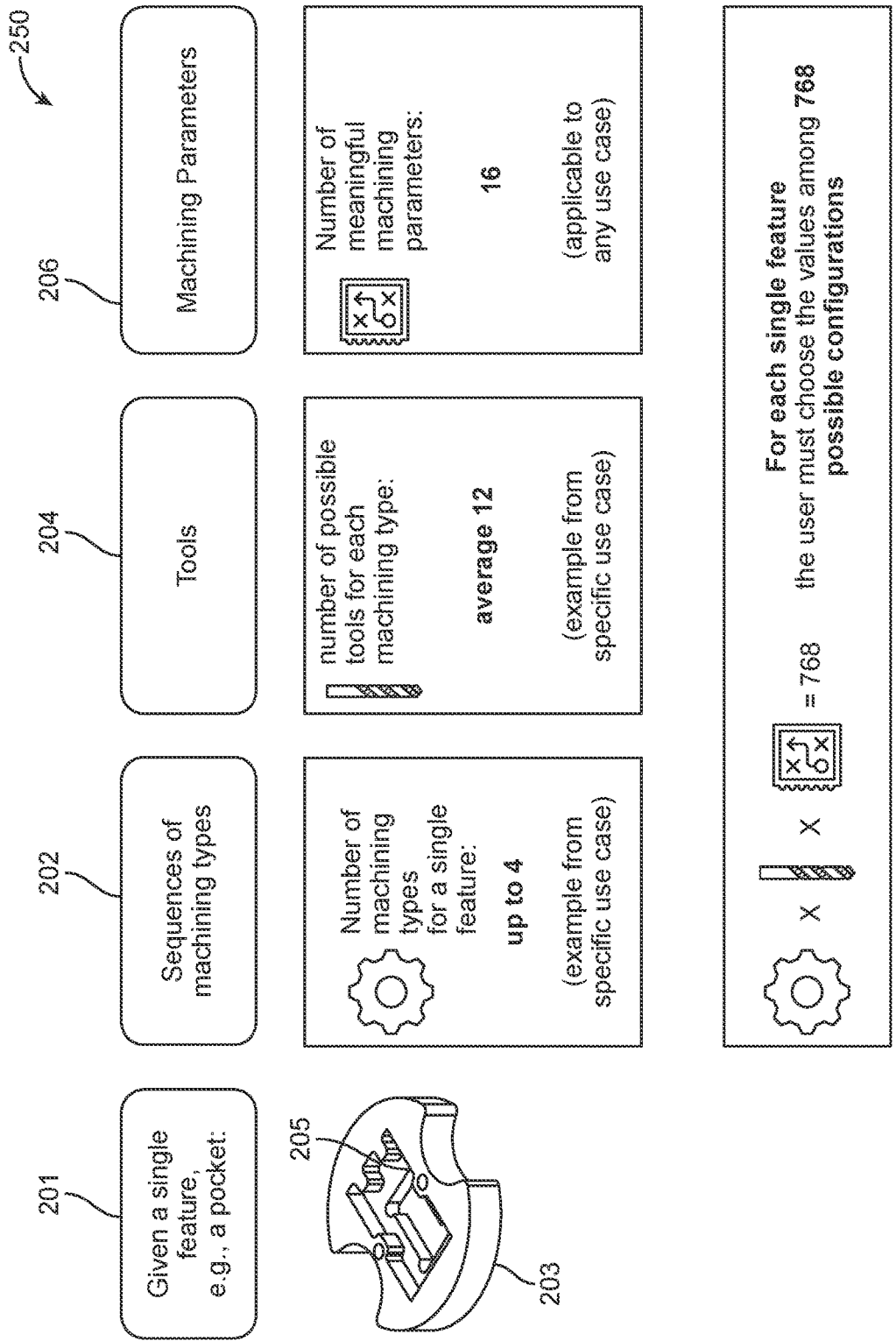
FIG. 3 depicts an example of a combination of choices presented to a user for selection associated with the user workflow of FIG. 2.

With respect to FIG. 3, an example of the workflow 250 of FIG. 2 may include many operations with a variety of tools and parameters selected showing the different combinations and possible permutations. Starting with the same steps and given a single feature, step 201, a sequence of machining types may be possible, step 202, where a user may select a number of machining types, e.g., up to four (4) machining types, in this example of the user's preferred sequence. In another embodiment, the user may select any number of machining types based on the given feature, as well as the user's data files and prior training. These machining types may be used to machine and make the given feature, such as the pocket 205 or a hole. Additionally, at step 204 a multitude of tools may be selected to create the pocket 205, such as an average of twelve (12) tools for the single specific goal of creating the pocket 205. At step 206, at least sixteen (16) parameters may be chosen from for each tool selected. In one embodiment, the user may decide to adjust the machining parameters presented. In another embodiment, the user may decide to leave the machining parameter values as they are (e.g., leave them as the default values). In this case, the user may select four (4) machining types with an average of twelve (12) tools, and sixteen (16) total parameters. In this example, the user must choose the values from among seven hundred sixty eight (768) possible configurations just to machine the one specific pocket feature 205. As such, more than seven hundred sixty eight (768) combinations are possible. Additionally, a target part may have more than one feature, and, hence, many more possible combinations for machining the feature.

As illustrated, these possible options give the user a cumbersome amount of combinations to choose from for the production of discrete parts such as molds, dies, tools, prototypes, aerospace components and more, which may result in a loss of time, increased user error, and loss of resources. Furthermore, it requires that users have a very deep level of knowledge of machining machine part model and/or geometry, when in reality users may have a wide range of machining experience and abilities.

Figure 4:
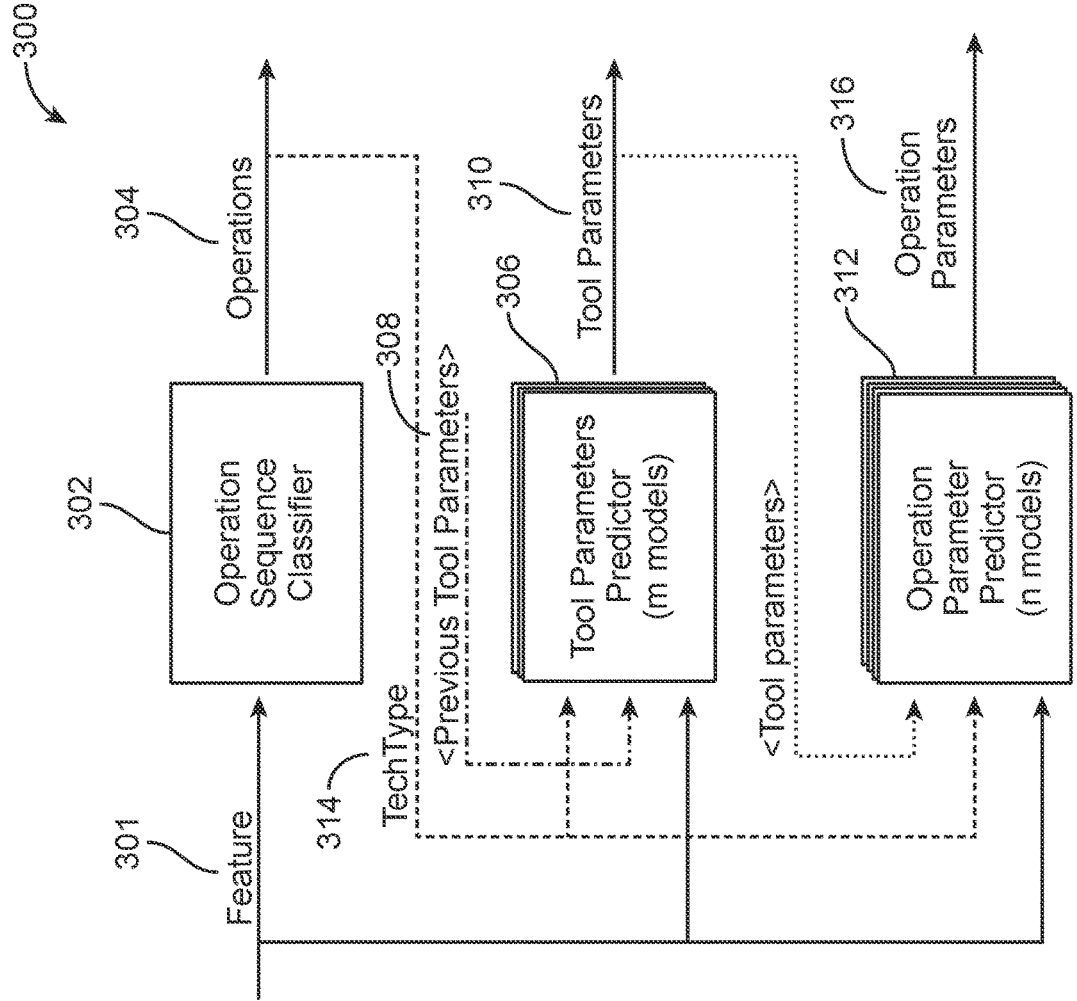
FIG. 4 depicts a flow diagram for predicting tool parameters and operation parameters based on a given input geometry feature.

With respect to FIG. 4, a flow diagram 300 for classifying operation sequences, predicting tool parameters, and predicting operation parameters within system 100 is illustrated. As depicted, the different components may each include a processor and addressable memory for executing instructions as separate components or may be running on the same computing device having one or more sets of processors and addressable memories. A geometry feature 301, such as pocket feature 205 (see FIG. 2) may be received at an Operation Sequence Classifier Component 302. In one embodiment, the Operation Sequence Classifier Component 302 may determine the order of operations for the feature based on a user's habits, environment, and skill set. For example, the Operation Sequence Classifier Component 302 may predict the sequence of machining types for the user, such as machining sequence of pocketing, then pocketing again (potentially performed with different tools and machine parameters), and finally contouring of the machine tool. Other sequences are possible and contemplated.

In one embodiment, the Operation Sequence Classifier Component 302 may be composed of one or more technologies 314, (e.g., a "TechType"), which specifies the type of operation applied to a feature, such as the pocket 205(see FIG. 2) or a hole feature. In one embodiment, the same technology may be repeated multiple times by the Operation Sequence Classifier Component 302 and the order in which such operations are applied to a feature is paramount. The system 100 may receive as an input all of the feature's attributes and output the predicted sequence of operations. In one embodiment, a sequence of instructions such as a "DecisionTreeClassifier" may be initiated by the Operation Sequence Classifier Component 302 at this step; therefore, shaping the problem as a classification one. Each unique operation sequence found in the user's previous examples (which may consist of operations applied to a given feature) may be treated as one of the possible classes to be assigned to a new inputted feature. A sequence of operations 304 may then be outputted to the user for implementation.

The sequence of operations 304 may be received at a Tool Parameters Predictor Component 306 along with the given feature 301, as well as prior tool parameters 308 that have been selected in previous iterations. For each entry of the predicted sequence of operations 304, the TechType 314 and an ordering (incremental number starting from one) is presented as input to the Tool Parameters Predictor Component 306. Given an entry of the list of the sequence of operations 304 and the order at which the entry is applied for a feature, such as pocket 205 or a hole, a tool must be linked to such an operation. With the given feature 301, the selected operations 304, and the prior tool parameters 308 provided as inputs, the Tool Parameters Predictor Component 306 of system 100 intelligently predicts and presents tool parameters 310 to the user for selection. In one embodiment, the Tool Parameters Predictor Component 306 may be used for predicting the most representative tool parameters 310. In one embodiment, the Tool Parameters Predictor Component 306 may be used for predicting a specified number, for example, five most representative tool parameters 310. The five most representative tool parameters 310 may provide for reducing complexity and focusing on geometric patterns. In another embodiment, the Tool Parameters Predictor Component 306 may be used for predicting more than the five most representative tool parameters 310. Given those tool parameters 310, a search may be conducted over a pool of pre-loaded tools, thus selecting the tools which are most applicable for that operation in creating efficiency and accuracy. In one embodiment, if the user is presented with a suggested tool that the user does not have, the user may manually select which tool to use. For example, the system 100 may suggest to the user to use a tool to cut a diameter of 13 inches. The user may only have a tool to cut diameters of 12 or 14 inches; thus, the user may manually select either the tool to cut the 12 inch diameter or the 14 inch diameter as the user sees fit. In one embodiment, the Tool Parameters Predictor Component 306 receives the selected operations 304 and the prior tool parameters 308 provided as inputs, and runs one of a number of models, such as m number of models to predict and output a tool parameter 310 for each model m. In another embodiment, the Tool Parameters Predictor Component 306 may receive a sequence of operations 304 and the prior tool parameters 308 as well as all of the sequence of operations and the prior tool parameters inputs from all of the previous models run to predict and output one of the tool parameters (see FIG. 5 for additional details).

In one embodiment, the predicted parameters for a tool are a tool style, a tool diameter, a cutting length, a shank diameter, and/or a tool radius. In one embodiment, the Tool Parameters Predictor Component 306 may employ, for example, a DecisionTreeRegressor and a KNearest-Neighbour model. In another embodiment, more than the five (5) listed predicted parameter settings may be employed for the analysis. In another embodiment, some of the five (5) parameters listed (or all of the 5 parameters listed) may be different parameters based on the user's dataset.

Finally, the operations 304 may be received at an Operation Parameter Predictor Component 312 along with the given feature 301, as well as the tool parameters 310 that have predicted by the Tool Parameters Predictor Component 306. With the given feature 301, the sequence of operations 304, and the prior tool parameters 308 as inputs, the Operation Parameter Predictor Component 312 of system 100 intelligently predicts and presents operation parameters 316 to the user for selection, such as the speed, feed rate, and motion pattern of the tool or tools. In one embodiment, the Operation Parameter Predictor Component 312 may execute and run a number of models, such as n number of models to predict the operation parameters 316. In one embodiment, the Operation Parameter Predictor Component 312 receives the given feature 301, the sequence of operations 304, and the prior tool parameters 308 as inputs and runs one of a number of models, such as n number of models to predict and output an operation parameter 316 for each model n. In another embodiment, the Operation Parameter Predictor Component 312 may receive a given feature, sequence of operations, and prior tool parameters as inputs as well as the given features, sequence of operations, and prior tool parameters from all of the previous models that have been run to predict and output one of the operation parameters.

Each technology or TechType 314 has its own set of parameters which may be predicted by the Operation Parameter Predictor Component 312. For example, the TechType 314 may include operations, such as chamfering, contouring, pocketing cycles, and the like. In one embodiment, the TechType may be a numeric code that identifies a type of operation, such as chamfering, contouring, pocketing cycles, and the like. For each TechType 314, there are the operation parameters predicted by the Operation Parameter Predictor Component 312, such as the speed, feed rate, and motion pattern of the tool. This prediction by the Operation Parameter Predictor Component 312 may depend on a user's habits on selecting and setting value to some parameters with respect to all available parameters. To account for each user's particular habits, during a pre-processing phase, a set of working parameters is selected for each possible TechType 314 and the set may be used to decide which parameter (or parameters) the Operation Parameter Predictor Component 312 has to predict.

In one embodiment, the set of operation parameters 316 may be chosen based on the computed "entropy" value for each operation parameter found in the user's examples. More specifically, a registry containing a census for all operation parameters 316 may be provided to the Operation Parameter Predictor Component 312. For each parameter, the registry is used in order to identify the type of the parameter (e.g., if it is a string, a boolean, an int, a double, or an enum), the desired predicted output (either categorical or free), and the precision at which it is possible to round the prediction. In one embodiment, in order to select the most applicable/suitable set of parameters to be predicted for each TechType 314, all operation parameters found in all past examples are taken into account (along with their set values), if the following conditions are met: (1) the parameter has been included in the registry, (2) the parameter has been set by the user and it is not a system default or a precomputed parameter, and (3) in the registry the parameter is not excluded explicitly. In an alternative embodiment, one or more of the above-mentioned conditions need to be met in order for the operation parameters, found in the previous examples, to be taking into account. By focusing only on those parameters changed by the user, the resulting subset is coherent with the user's habits over time. From such a subset, the entropy may be computed for each parameter based on its value distribution, resulting in a number between 0 and 1. Entropy close to 1 represents a parameter which assumes two or more values with similar probabilities. That is, if a parameter assumes only a single value across all examples, the entropy is 0. If there is a value in the distribution which presents a higher probability with the respect to the others, the entropy goes to 0. The entropy is then used for estimating how important it is to include a parameter on the list of those to be predicted by the Operation Parameter Predictor Component 312. A high entropy for a parameter means the parameter has been set many times with different values, and values assumed by the parameter are equally distributed. Setting a threshold for the entropy allows for selecting parameters which the user is most likely to change frequently and for which a suggestion is needed. In one embodiment, the default threshold value for the entropy is set to 0.2 by default.

Figure 5:
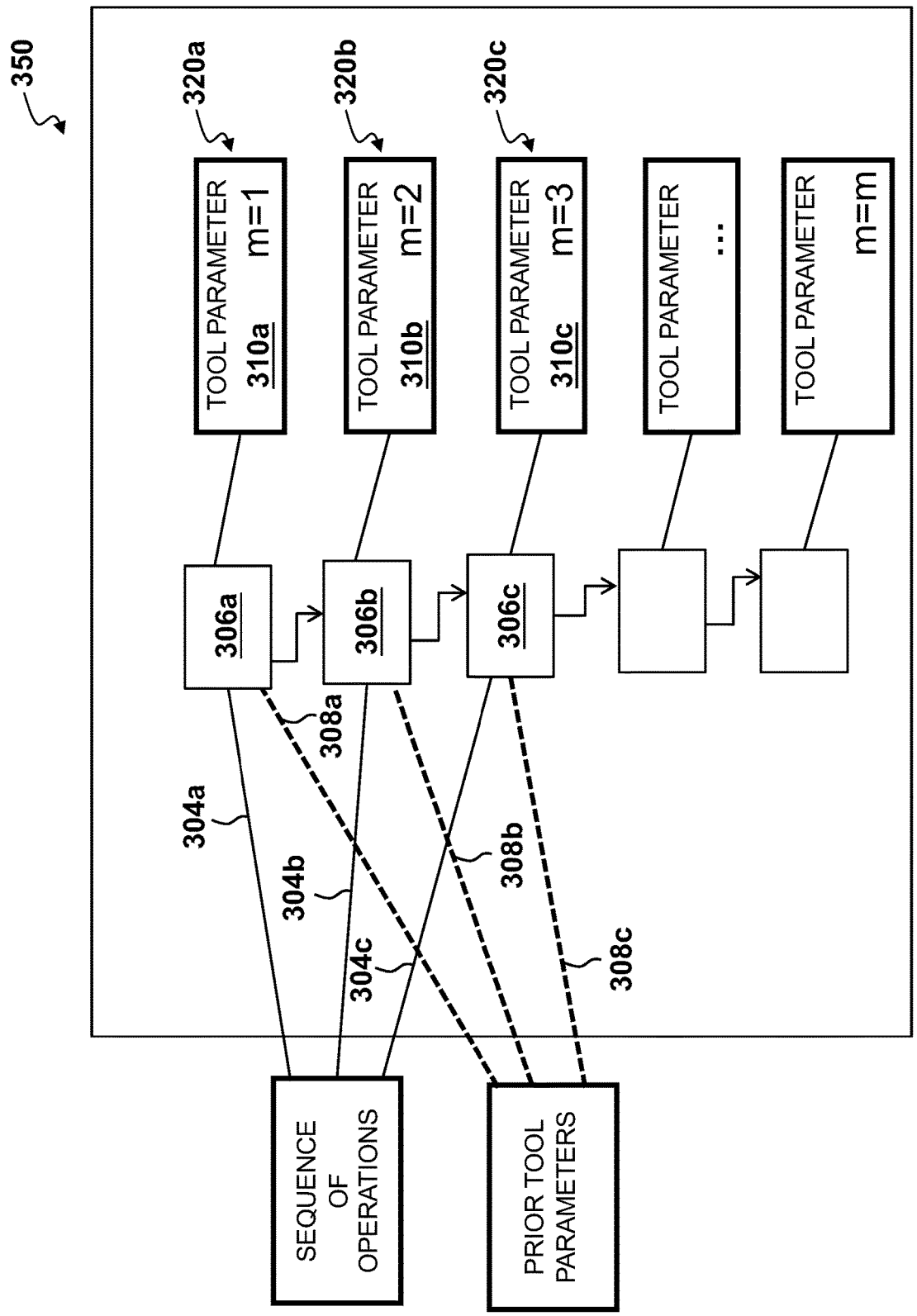
FIG. 5 depicts a flow diagram of models to predict and output a tool parameter.

With respect to FIG. 5, a flow diagram 350 of models for predicting and outputting a tool parameter is shown. In one embodiment, m models (m=1, 2, 3, . . . ,m=m), such as the m models described above with respect to FIG. 4, may be executed to predict and output a tool parameter for each model m that is run. More specifically, for a first model 320a (e.g., m=1), a first Tool Parameters Predictor Component 306a receives a first sequence of operations 304a and a first prior tool parameters 308a provided as inputs. The first model 320a may predict and output a first tool parameter 310a. For a second model 320b (e.g., m=2), a second Tool Parameters Predictor Component 306b may receive a second sequence of operations 304b and a second prior tool parameters 308b provided as inputs. In one embodiment, the Tool Parameters Predictor Component 306b may also receive the first sequence of operations 304a and the first prior tool parameters 308a from model 320a as additional inputs. The second model 320b (e.g., m=2) may then predict and output a second tool parameter 310b based on the first sequence of operations 304a and the first prior tool parameters 308a from model 320a as well as the second sequence of operations 304b and the second prior tool parameters 308b. For a third model 320c (e.g., m=3), a third Tool Parameters Predictor component 306c may receive a third sequence of operations 304c and a third prior tool parameters 308c provided as inputs. In one embodiment, the Tool Parameters Predictor 306c may also receive the first sequence of operations 304a and the first prior tool parameters 308a from model 320a as inputs. In another embodiment, the Tool Parameters Predictor component 306c may also receive the second sequence of operations 304b and the second prior tool parameters 308b from model 320b as inputs. The third model 320c may then predict and output a third tool parameter 310c based on the first sequence of operations 304a and the first prior tool parameters 308a from model 320a, the second sequence of operations 304b and the second prior tool parameters 308b from model 320b, as well as the third sequence of operations 304c and the third prior tool parameters 308c. As such, each new model iteration that is ran, may incorporate inputs from previously models; therefore, the tool parameter prediction may become more and more accurate compared to the previous prediction with the execution of more models.

Figure 6:
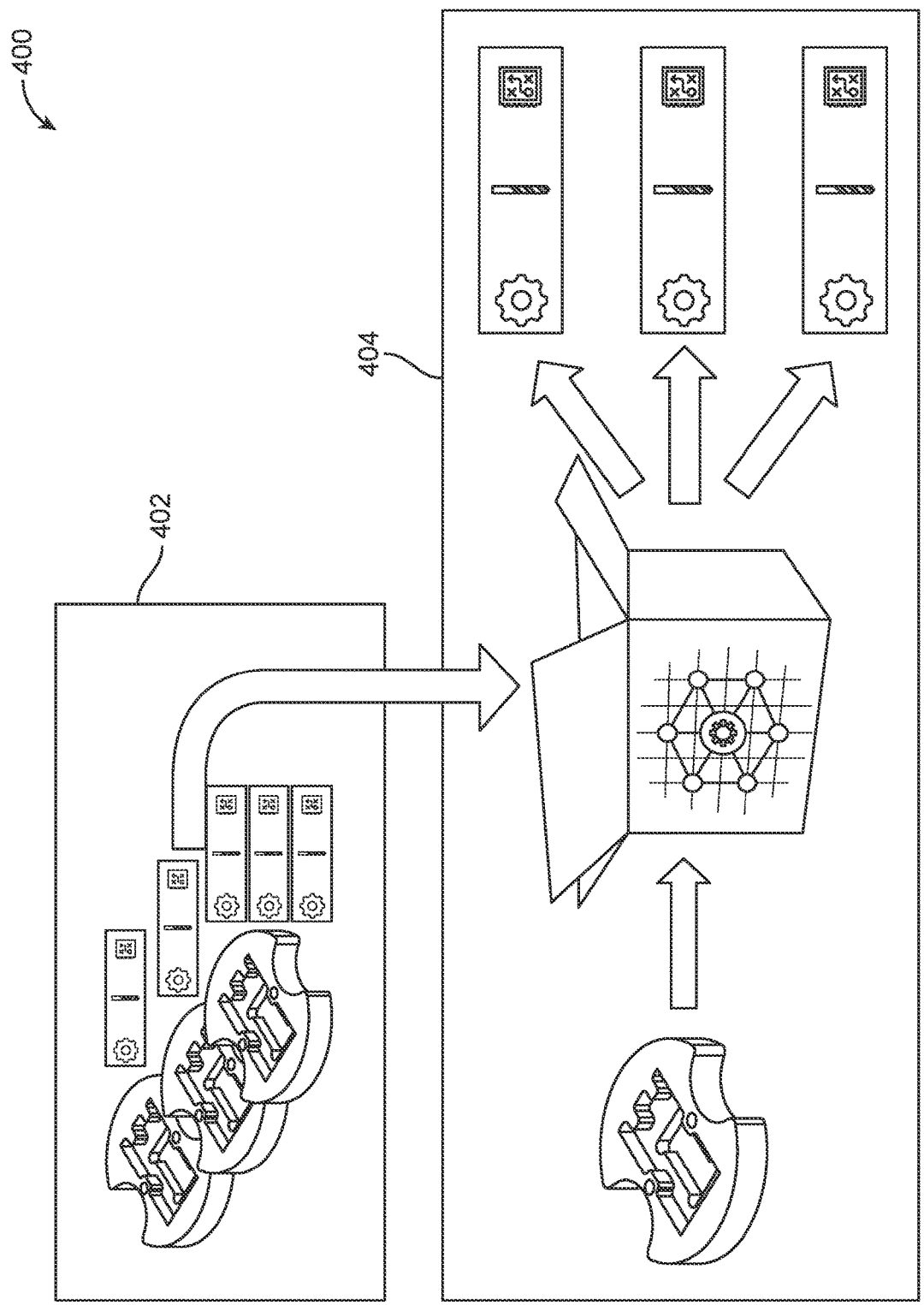
FIG. 6 depicts a workflow of the system for providing automatic recommendation to a user in a CAM environment.

With respect to FIG. 6, the system 100 may execute a workflow 400 for providing automatic recommendation of the customized programming workflow for a user for manufacturing machinery in a CAM environment, such as CNC toolpath creation, or for the production of discrete parts such as molds, dies, tools, prototypes, aerospace components and more. In one embodiment, the workflow 400 may be a series of instructions from the system 100 that are steps for providing the automatic recommendation. More specifically, at step 402, the system 100 may leverage user history (e.g., historical data of user's choices) to make the informed recommendation via the disclosed system and method of applying AI to automatically guide the user through the optimal choices. In one embodiment, the user history includes all of the data associated with the user's manual decision making steps needed for machining a machine part geometry, such as pocket 205, a hole, or other feature described above. With respect to the example of FIG. 3, the system 100 may analyze the choices the user made at steps 202, 204, and 206 to machine the pocket 205. More specifically, the system 100 may analyze the machining types selected, which tools were used, and the parameter values selected for each applied machining. That is, the tool has parameters describing the tool's shape and cutting capabilities. Once the tool is chosen, the parameters of the machining may be set. In one example, the diameter of the tool may impact the distance between two passes; therefore, in order to avoid excess material being left over in between passes, each pass should be approximately one forth (¼) of the tool radius. However, as it may be deduced, if the user's dataset includes data which is not the optimal manner in which the machining should be performed, then the system's prediction may reflect such inefficient or incorrect parameters and learned from. For example, if a user consistently selects that each pass is one eighth (⅛) of the tool radius, then the system may learn to use that value. This may occur, for example, if the user is inexperienced, and the user consistently enters an incorrect value. The system accepts that value, because the system is learning from the user and the value may be within acceptable thresholds by the machine. In one embodiment, the system may determine that the user is using inefficient or incorrect parameters by comparing the user's dataset with another dataset, where the other dataset may be either from another user, historical data of the same user, or default parameters recommended by the manufacturer of the machining tool. According to this embodiment, the system may then, based on a threshold, tag the user dataset in a way so as to not be used for the machine learning process or given less weight for purposes of determining predictions. That is, the system may be configured to detect or determine that the parameters being used, for example, by an inexperienced user, are outside a range or variance (statistical measure of the amount of variation in the given parameter or variable) and thereby prevent the system from including such datasets as part of the learning process, e.g., used as input. Additionally, in some embodiments, the system may also be configured to determine a variance threshold, where a feature/parameter does not vary much within itself, and tag such parameters as being such datasets generally having very little predictive power—thereby either including or excluding such data.

In another embodiment, users may cross-share knowledge with other users via, for example, accessing other databases storing such datasets, so the system may learn based on data from a plurality of users. In one embodiment, if the user or users accumulate examples that lead to higher accuracy then the system may learn from the examples and offer the associated parameter values to the user or users. In yet another embodiment, a user may update their dataset with a new tool that becomes available, for example, if this tool did not exist when the user made their first training set. The system may then retrain itself based on the addition of this new tool to the training set.

In one embodiment, said data associated with the user's manual decision making steps (e.g., the machining types selected, which tools were used, and the parameter values selected for each applied machining) may be in the form of text files, for example, eXtensible Mark-up Language (XML) files, Rich Text Format (.rtf) files, plain text data (.dat), and the like. The processor 124 of the system 100 may execute steps to apply a machine learning algorithm (e.g., artificial intelligence (AI)) to the user data. The AI algorithm may therefore be constantly learning from the specific set of files from each specific user. Each user may work on the same geometry (e.g., the geometry of the pocket 205) in dissimilar ways; therefore, the system 100 may leverage each specific user's history to efficiently predict how the specific user prefers to machine the part. Furthermore, the system 100 is configured to analyze user decision making changes over time. For example, the system 100 analyzes the way the user may refine how they machine a given feature, such as a pocket 205 or another given feature, such as a hole over time as a result of numerous potential factors, such as an improved skill set over time. In one example, a user that has been machining machine tools in a CAM environment for 20 years is likely more skilled than a user that has been doing the same machining for 2 years. Therefore, the system 100 embodiment may provide different suggestions to each user based on the user's skill set. Additionally, technology changes with time, and the system 100 may learn how the user adapts to newly-introduced technologies and provide recommendations accordingly.

At step 404, the system 100 automatically guides the user through the optimal choices for machining the machine part geometry based upon the system leveraging the user's machining past. Therefore, each user automatically receives a specific recommendation based on the user's history and skill set. In addition, the system 100 may continue to learn, understand, and improve the prediction precision by way of performing data analysis which automates analytical model building where the system learns from data, identifies patterns and makes predictions through experience, and automatically improves the machining of a part for higher accuracy and efficiency. In one embodiment, each time the user programs a new part, the system 100 may store or 'add' this data into the system 100, and use the data to continually become more intelligent by building a historical database of user data which inherently is based on their tools and skills. In one embodiment, the system 100 may leverage historical data from other users using similar machines or machining similar features (e.g., pocket or hole) or both, to aggregate historical data across different platforms of cutting tools and cutting machines for improving accuracy of predictions by the system.

Figure 7:
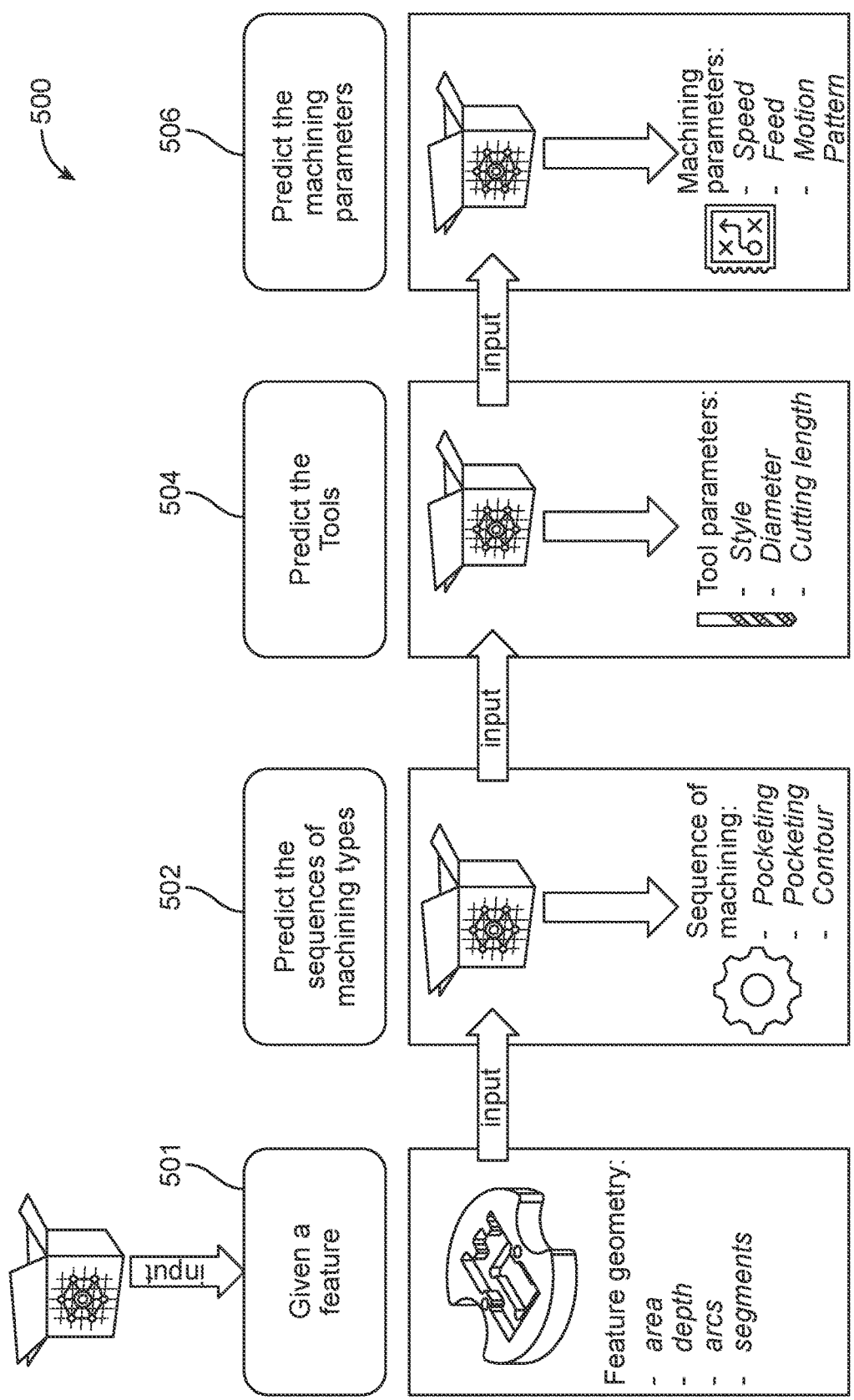
FIG. 7 depicts a workflow of the system for providing automatic recommendation to a user in a CAM environment based on a given feature.

With respect to FIG. 7, a workflow 500 for system 100 is shown in detail. At step 501, the system is given a feature to manufacture, such as a pocket. The pocket may be described by a planar contour, a composition or arcs and segments, as well as a set of attributes, such as area and depth. Other attributes may be included, or used in place of existing attributes, for example, from data collected and stored in a local or remote database. At step 502 the system 100 predicts a sequence of machining types based on the user's history of machining a pocket for the machine tool. For example, the system 100 predicts that to manufacture the pocket, the user selects a machining sequence of pocketing, then pocketing again (potentially performed with different tools and machine parameters), and finally contouring of the machine tool. At step 504, the system 100 uses the prediction at step 502 for machining the pocket geometry of step 501 as an input for algorithm to predict the tool parameters to select, such as style, diameter, and cutting length. At step 506, the system receives as inputs the pocket feature of step 501, the predicted machining type sequence of step 502, and the predicted tools of step 504. From these inputs, the algorithm may predict the machining parameters for the operations, such as the speed, feed rate, and motion pattern. The system 100 becomes more accurate and/or efficient over time, after each iteration, and as the data set gets larger. Therefore, with each automatic recommendation by the system 100, based on the user's history, and eventually modified by the user to better machine the geometry, the system 100 will learn how the user decided to work the part. The system 100 is able to predict with more certainty as a result of the user's history and behavior patterns, rather than logic input directly into the system 100.

Figure 8:
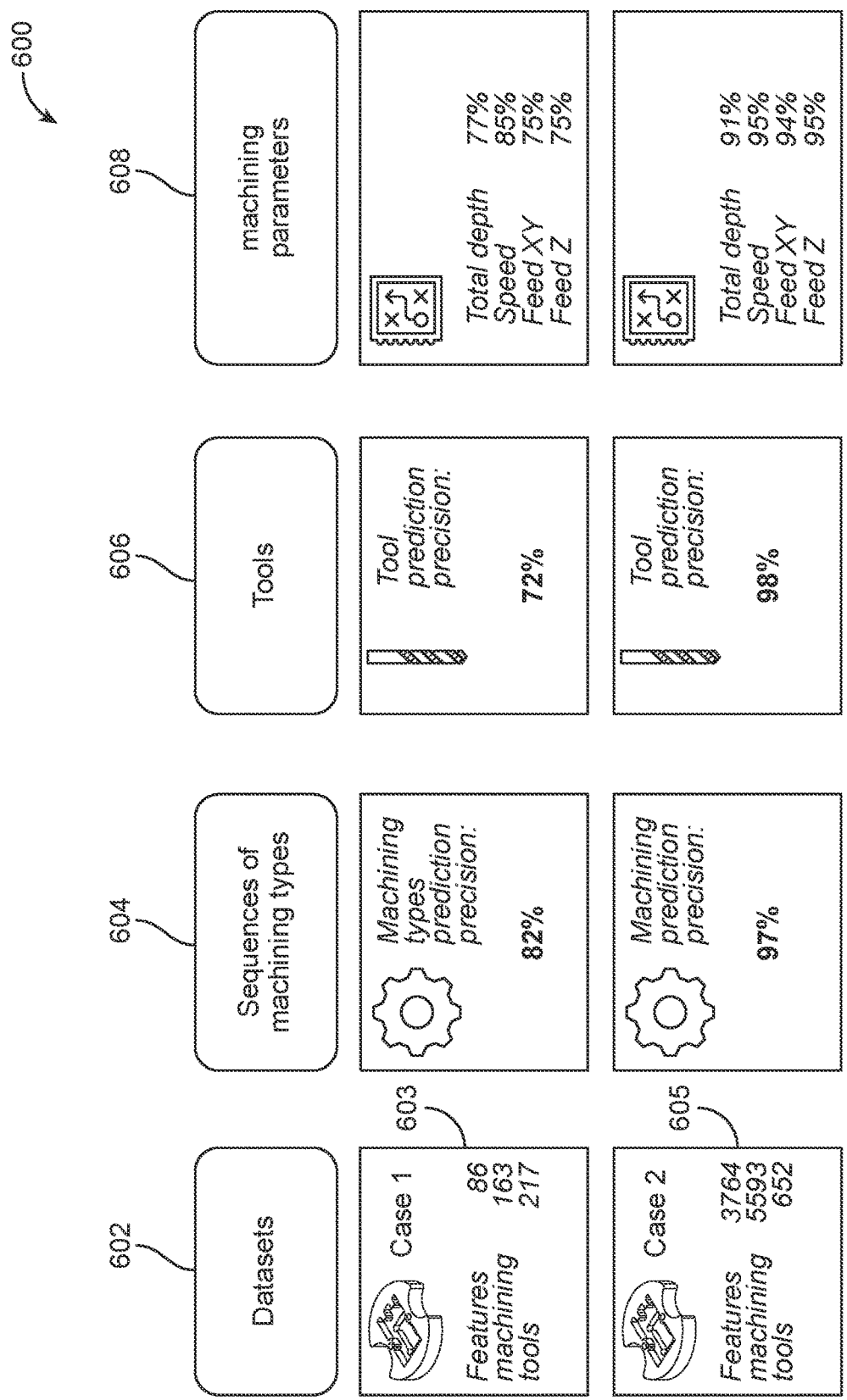
FIG. 8 depicts results of the accuracy of the system for distinct users.

With respect to FIG. 8, results of the accuracy of system 100 for distinct users are illustrated 600. A dataset 602 includes a first Case 603 and a second Case 605. With respect to the first Case 604, the user machined 86 features (e.g., 86 different pockets), used 163 machining sequences, and 217 tools. The user provided the system 100 with these data as a dataset to train the algorithm. For predictions of user sequences of machining types 604, the algorithm predicted and outputted the same sequence the user selected approximately 82% of the time. For predictions of tools 606 selected by the user, the algorithm predicted and outputted the same tools the user selected approximately 72% of the time. For predictions of machining parameters 608 selected by the user, in this example, the algorithm predicted and outputted the total depth of the machining tool 77% of the time, the speed of the machining tool 85% of the time, the feed rate of the machining tool in the XY plane 75% of the time, and the feed rate of the machining tool in the Z plane 75% of the time.

With respect to the second Case 605, the user machined 3,746 features (e.g., 3,746 different pockets), used 5,593 machining sequences, and 652 tools. The user provided the system 100 with these data as a dataset to train the algorithm. For predictions of user sequences of machining types 604, the algorithm predicted and outputted the same sequence the user selected approximately 97% of the time. For predictions of tools 606 selected by the user, the algorithm predicted and outputted the same tools the user selected approximately 98% of the time. For predictions of machining parameters 608 selected by the user, the algorithm predicted and outputted the total depth of the machining tool 91% of the time, the speed of the machining tool 95% of the time, the feed rate of the machining tool in the XY plane 94% of the time, and the feed rate of the machining tool in the Z plane 95% of the time. These results clearly demonstrate that algorithm gets substantially more intelligent (e.g., improves in performance) as the sample size increases. If the user history is sufficiently large, such as up to 3,500 features, then the algorithm suggests to the user the correct choice 95 out of 100 times at each step in the workflow. However, results may be biased if a user uses the same technique every time; therefore, it is desired to have not only more data per user, but more users as well.

In some embodiments, the system 100 may be separately trained for each user's case. Additionally, the user does not need to share the actual files nor any other sensitive or proprietary data with the system 100. In one embodiment, all of the user data may be contained on the user's own machine, and the user may run the system 100 on the user's files/documents. In one embodiment, separate user information may be joined to come to provide a more idealized recommendation that each user could implement. In yet another embodiment, the user data may be sourced from external data servers and not only include the user's data (saved from the local machine to the external data servers) but also optionally include data from a set of other users. Such data may be selected based on a number of criterion, for example, whether the set of other users were using similar attributes, for example, cutting tool, workpiece, etc.

Figure 9:
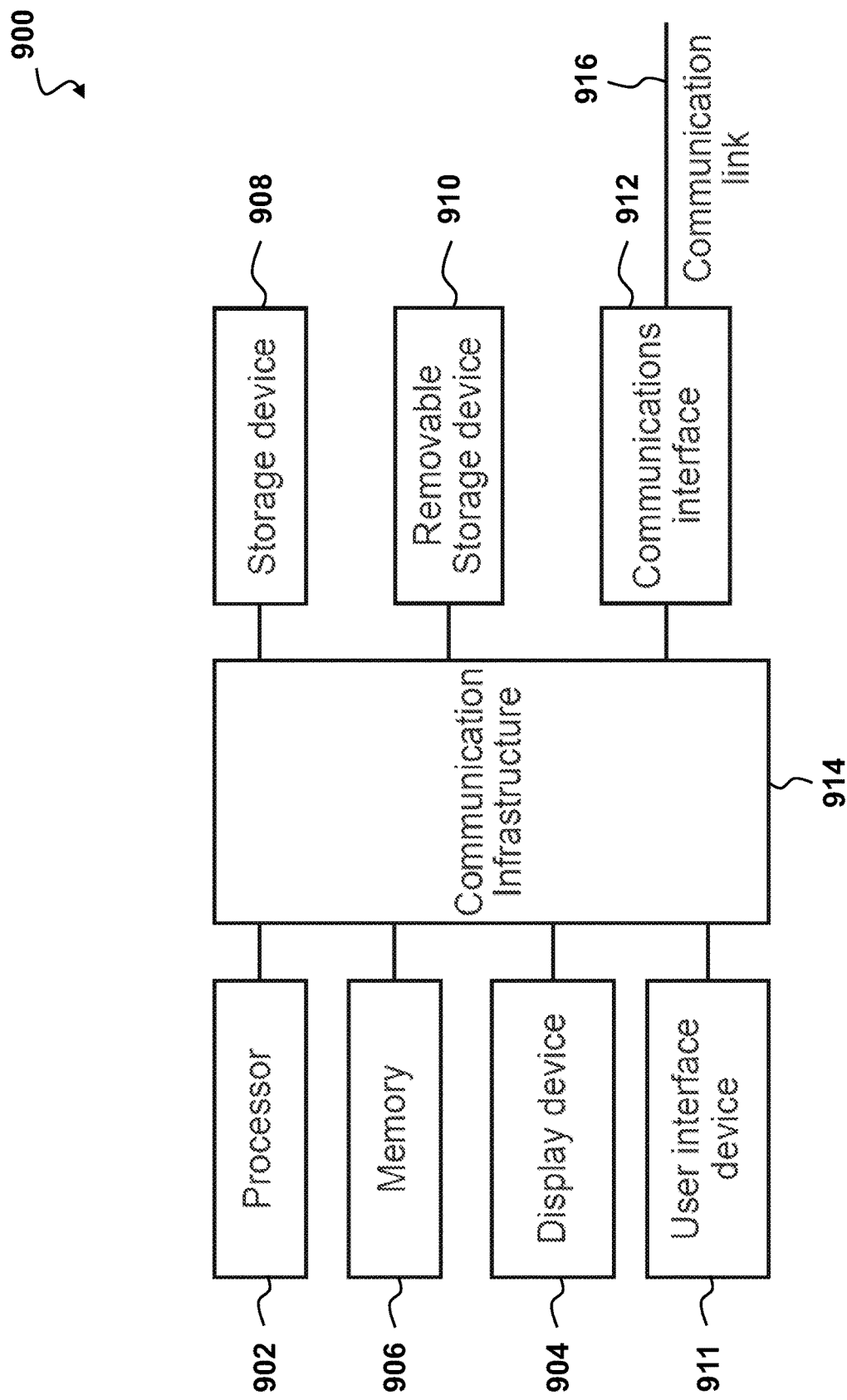
FIG. 9 shows a high-level block diagram and process of a computing system for implementing an embodiment of the system and process.

FIG. 9 is a high-level block diagram 900 showing a computing system comprising a computer system useful for implementing an embodiment of the system and process, disclosed herein. Embodiments of the system may be implemented in different computing environments. The computer system includes one or more processors 902, and can further include an electronic display device 904 (e.g., for displaying graphics, text, and other data), a main memory 906 (e.g., random access memory (RAM)), storage device 908, a removable storage device 910 (e.g., removable storage drive, a removable memory module, a magnetic tape drive, an optical disk drive, a computer readable medium having stored therein computer software and/or data), user interface device 911 (e.g., keyboard, touch screen, keypad, pointing device), and a communication interface 912 (e.g., modem, a network interface (such as an Ethernet card), a communications port, or a PCMCIA slot and card). The communication interface 912 allows software and data to be transferred between the computer system and external devices. The system further includes a communications infrastructure 914 (e.g., a communications bus, cross-over bar, or network) to which the aforementioned devices/modules are connected as shown.

Information transferred via communications interface 914 may be in the form of signals such as electronic, electromagnetic, optical, or other signals capable of being received by communications interface 914, via a communication link 916 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 912. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 10:
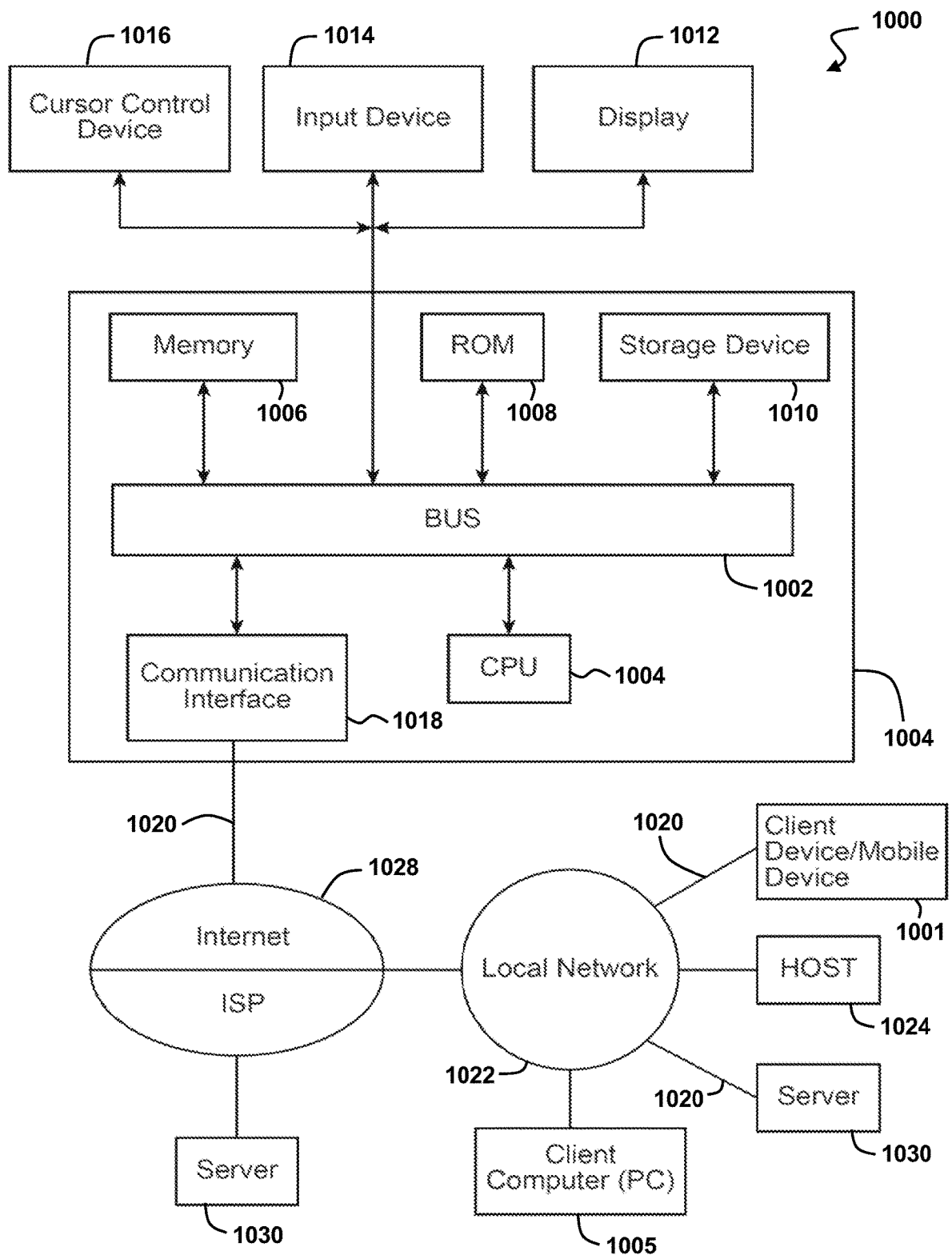
FIG. 10 shows a block diagram and process of an exemplary system in which an embodiment may be implemented.

FIG. 10 shows a block diagram of an example system 1000 in which an embodiment may be implemented. The system 1000 includes one or more client devices 1001 such as consumer electronics devices, connected to one or more server computing systems 1030. A server 1030 includes a bus 1002 or other communication mechanism for communicating information, and a processor (CPU) 1004 coupled with the bus 1002 for processing information. The server 1030 also includes a main memory 1006, such as a random access memory (RAM) or other dynamic storage device, coupled to the bus 1002 for storing information and instructions to be executed by the processor 1004. The main memory 1006 also may be used for storing temporary variables or other intermediate information during execution or instructions to be executed by the processor 1004. The server computer system 1030 further includes a read only memory (ROM) 1008 or other static storage device coupled to the bus 1002 for storing static information and instructions for the processor 1004. A storage device 1010, such as a magnetic disk or optical disk, is provided and coupled to the bus 1002 for storing information and instructions. The bus 1002 may contain, for example, thirty-two address lines for addressing video memory or main memory 1006. The bus 1002 can also include, for example, a 32-bit data bus for transferring data between and among the components, such as the CPU 1004, the main memory 1006, video memory and the storage 1010. Alternatively, multiplex data/address lines may be used instead of separate data and address lines.

The server 1030 may be coupled via the bus 1002 to a display 1012 for displaying information to a computer user. An input device 1014, including alphanumeric and other keys, is coupled to the bus 1002 for communicating information and command selections to the processor 1004. Another type or user input device comprises cursor control 1016, such as a mouse, a trackball, or cursor direction keys for communicating direction information and command selections to the processor 1004 and for controlling cursor movement on the display 1012.

According to one embodiment, the functions are performed by the processor 1004 executing one or more sequences of one or more instructions contained in the main memory 1006. Such instructions may be read into the main memory 1006 from another computer-readable medium, such as the storage device 1010. Execution of the sequences of instructions contained in the main memory 1006 causes the processor 1004 to perform the process steps described herein. One or more processors in a multi-processing arrangement may also be employed to execute the sequences of instructions contained in the main memory 1006. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 1004 for execution. Such a medium may take many forms, including but not limited to, non-volatile media, volatile media, and transmission media. Non-volatile media includes, for example, optical or magnetic disks, such as the storage device 1010. Volatile media includes dynamic memory, such as the main memory 1006. Transmission media includes coaxial cables, copper wire and fiber optics, including the wires that comprise the bus 1002. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1004 for execution. For example, the instructions may initially be carried on a magnetic disk of a remote computer. The remote computer can load the instructions into its dynamic memory and send the instructions over a telephone line using a modem. A modem local to the server 1030 can receive the data on the telephone line and use an infrared transmitter to convert the data to an infrared signal. An infrared detector coupled to the bus 1002 can receive the data carried in the infrared signal and place the data on the bus 1002. The bus 1002 carries the data to the main memory 1006, from which the processor 1004 retrieves and executes the instructions. The instructions received from the main memory 1006 may optionally be stored on the storage device 1010 either before or after execution by the processor 1004.

The server 1030 also includes a communication interface 1018 coupled to the bus 1002. The communication interface 1018 provides a two-way data communication coupling to a network link 1020 that is connected to the world wide packet data communication network now commonly referred to as the Internet 1028. The Internet 1028 uses electrical, electromagnetic or optical signals that carry digital data streams. The signals through the various networks and the signals on the network link 1020 and through the communication interface 1018, which carry the digital data to and from the server 1030, are exemplary forms or carrier waves transporting the information.

In another embodiment of the server 1030, interface 1018 is connected to a network 1022 via a communication link 1020. For example, the communication interface 1018 may be an integrated services digital network (ISDN) card or a modem to provide a data communication connection to a corresponding type of telephone line, which can comprise part of the network link 1020. As another example, the communication interface 1018 may be a local area network (LAN) card to provide a data communication connection to a compatible LAN. Wireless links may also be implemented. In any such implementation, the communication interface 1018 sends and receives electrical electromagnetic or optical signals that carry digital data streams representing various types of information.

The network link 1020 typically provides data communication through one or more networks to other data devices. For example, the network link 1020 may provide a connection through the local network 1022 to a host computer 1024 or to data equipment operated by an Internet Service Provider (ISP). The ISP in turn provides data communication services through the Internet 1028. The local network 1022 and the Internet 1028 both use electrical, electromagnetic or optical signals that carry digital data streams. The signals through the various networks and the signals on the network link 1020 and through the communication interface 1018, which carry the digital data to and from the server 1030, are exemplary forms or carrier waves transporting the information.

The server 1030 can send/receive messages and data, including e-mail, program code, through the network, the network link 1020 and the communication interface 1018. Further, the communication interface 1018 can comprise a USB/Tuner and the network link 1020 may be an antenna or cable for connecting the server 1030 to a cable provider, satellite provider or other terrestrial transmission system for receiving messages, data and program code from another source.

The example versions of the embodiments described herein may be implemented as logical operations in a distributed processing system such as the system 1000 including the servers 1030. The logical operations of the embodiments may be implemented as a sequence of steps executing in the server 1030, and as interconnected machine modules within the system 1000. The implementation is a matter of choice and can depend on performance of the system 1000 implementing the embodiments. As such, the logical operations constituting said example versions of the embodiments are referred to for e.g., as operations, steps or modules.

Similar to a server 1030 described above, a client device 1001 can include a processor, memory, storage device, display, input device and communication interface (e.g., e-mail interface) for connecting the client device to the Internet 1028, the ISP, or LAN 1022, for communication with the servers 1030.

The system 1000 can further include computers (e.g., personal computers, computing nodes) 1005 operating in the same manner as client devices 1001, where a user can utilize one or more computers 1005 to manage data in the server 1030.

Figure 11:
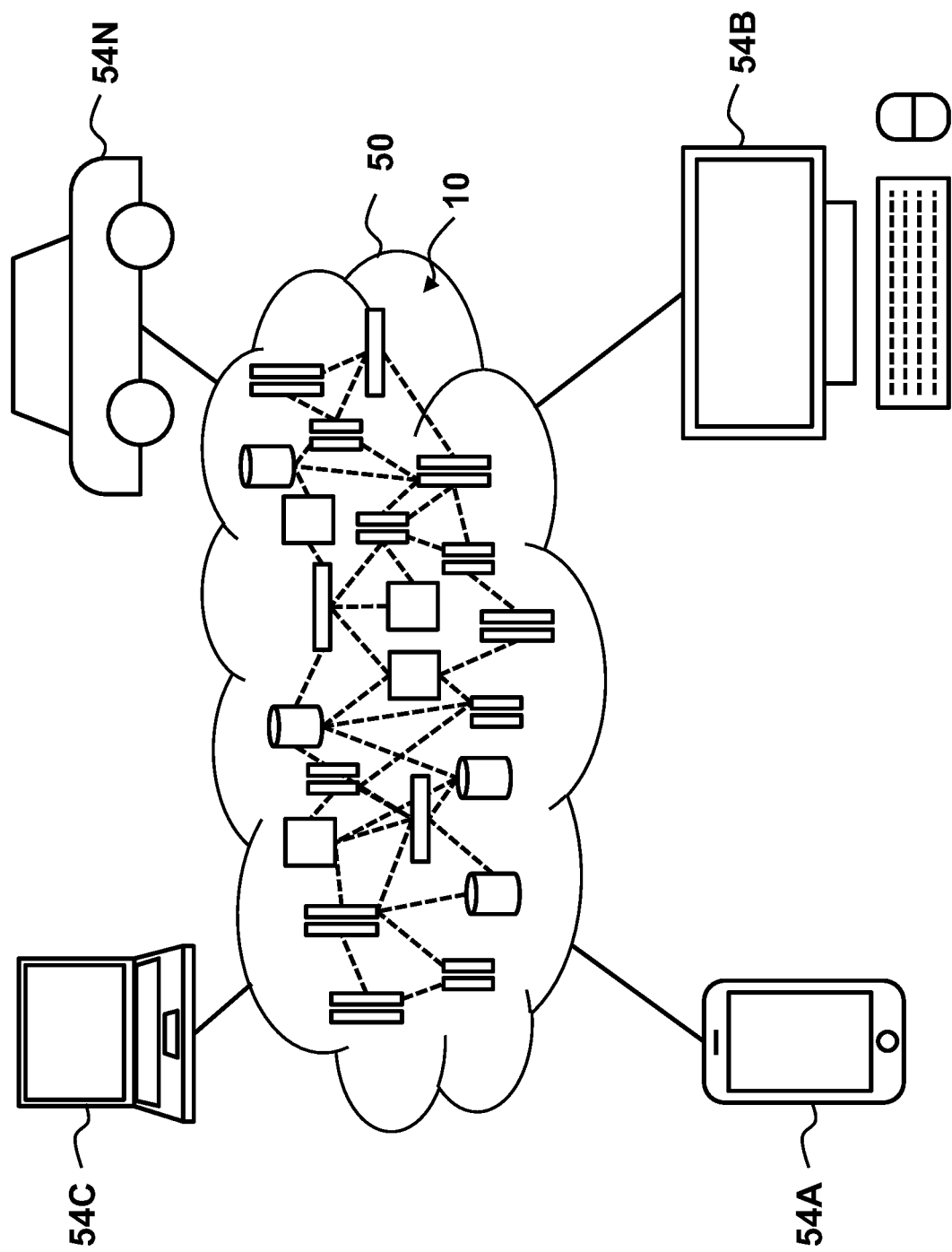
FIG. 11 depicts a cloud computing environment for implementing an embodiment of the system and process disclosed herein.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A method comprising:
   selecting one or more sequences of machining types for a feature of one or more features, wherein the selection of the one or more sequences of machining types is based on the feature and a database of prior selections by a user of machining types, wherein the database of prior selections by a user of machining types is built based on a user's skill set and experiential habits;
   selecting one or more tools associated with the selected one or more sequences of machining types, wherein the selection of the one or more tools is based on the feature, the selected one or more sequences of machining types, and a database of prior selections by the user of one or more tools;
   determining one or more machining parameters for the selected one or more tools, wherein the determined machining parameters are based on the feature, the selected one or more sequences of machining types, the selected one or more tools, and a database of prior determinations by the user of one or more machining parameters; and
   determining a machining workflow prediction in a computer aided manufacturing (CAM) environment based on the selected one or more sequences of machining types, the selected one or more tools, and determined one or more machining parameters, thereby leveraging historical data of a user's prior selections for the determined machining workflow prediction to make an informed recommendation to the user.

2. The method of claim 1, wherein the determined one or more machining parameters comprise at least one of: speed, feed rate, and motion pattern.

3. The method of claim 1, wherein determining more accurate machining workflow prediction in comparison to a set of previous predictions is based on the execution of more models.

4. The method of claim 3, further comprising:
   assigning a weight to a previous prediction of the set of previous predictions.

5. The method of claim 1, further comprising:
   determining a set of user preferences; and
   associating the determined set of user preferences with machining tools.

6. The method of claim 5 further comprising:
   associating the determined set of user preferences with machining tools and comfort levels exhibited by the user.

7. The method of claim 1, wherein determining a machining workflow prediction is based on determining energy-efficient toolpath having least number of movements, cutting operations, and cutting time, thereby reducing unneeded movements and cycle time combined with shortened tool lengths.

8. The method of claim 1, wherein database comprises the historical data of user selections and determinations, collected over a period of time.

9. The method of claim 1, wherein selecting one or more sequences of machining types is further based on a user's history of machining a pocket for the machine tool.

10. The method of claim 1, wherein the determined machining workflow prediction comprises predicted parameters for a tool; wherein the predicted parameters for a tool include at least one of: a tool style, a tool diameter, a cutting length, a shank diameter, and a tool radius.

11. The method of claim 1, wherein the determined machining workflow prediction is transmitted to a user interface at the Computer aided manufacturing (CAM) used to program computer numerical control (CNC) machine for implementation by a user.

12. The method of claim 1, wherein the determining a machining workflow prediction in a computer aided manufacturing (CAM) environment is further based on a user's initial data set and new data, wherein the new data is new machining test files.

13. The method of claim 12, wherein the new data is new machining test files and used if a calculated accuracy does not match a user's expectancy.

14. A system comprising:
an Operation Sequence Classifier Component having a processor and addressable memory, wherein the Operation Sequence Classifier Component is configured to:
select one or more sequences of operations for each feature of one or more features based on receiving a geometry feature;
wherein the one or more sequences of operations is selected based on a user's habits, environment, and skill set;
a Tool Parameters Predictor Component having a processor and addressable memory, wherein the Tool Parameters Predictor Component is configured to:
receive the selected one or more sequences of operations, each feature of the one or more features, and one or more prior tool parameters selected by the user; and
select one or more tool parameters based on the received selected one or more sequences of operations, each feature of the one or more features, and the one or more prior tool parameters selected by the user; and
an Operation Parameter Predictor Component having a processor and addressable memory, wherein the Operation Parameter Predictor Component is configured to:
receive the selected one or more sequences of operations and the selected one or more tool parameters; and
determine one or more operation parameters based on the received selected one or more sequences of operations and the selected one or more tool parameters; wherein the one or more operation parameters is based on the user's habits on selecting and setting value to some parameters with respect to all available parameters and obtained from a database comprising a census for all operation parameters.

15. A method comprising:
selecting one or more sequences of machining types for a feature of one or more features, wherein the selection of the one or more sequences of machining types is based on the feature and a database of prior selections by a user of machining types;
selecting one or more tools associated with the selected one or more sequences of machining types, wherein the selection of the one or more tools is based on the feature, the selected one or more sequences of machining types, and a database of prior selections by the user of one or more tools;
determining one or more machining parameters for the selected one or more tools, wherein the determined machining parameters are based on the feature, the selected one or more sequences of machining types, the selected one or more tools, and a database of prior determinations by the user of one or more machining parameters; and
determining a machining workflow prediction in a computer aided manufacturing (CAM) environment based on the selected one or more sequences of machining types, the selected one or more tools, determined one or more machining parameters, and a user's initial data set and new data, wherein the new data is new machining test files, thereby leveraging historical data of a user's prior selections for the determined machining workflow prediction to make an informed recommendation to the user.

16. The method of claim 15, wherein the new data is new machining test files and used if a calculated accuracy does not match a user's expectancy.

17. A method comprising:
selecting one or more sequences of machining types for a feature of one or more features, wherein the selection of the one or more sequences of machining types is based on the feature and a database of prior selections by a user of machining types;
selecting one or more tools associated with the selected one or more sequences of machining types, wherein the selection of the one or more tools is based on the feature, the selected one or more sequences of machining types, and a database of prior selections by the user of one or more tools;
determining a set of user preferences and associating the determined set of user preferences with machining tools and comfort levels exhibited by the user;
determining one or more machining parameters for the selected one or more tools, wherein the determined machining parameters are based on the feature, the selected one or more sequences of machining types, the selected one or more tools, and a database of prior determinations by the user of one or more machining parameters; and
determining a machining workflow prediction in a computer aided manufacturing (CAM) environment based on the selected one or more sequences of machining types, the selected one or more tools, and determined one or more machining parameters, thereby leveraging historical data of a user's prior selections for the determined machining workflow prediction to make an informed recommendation to the user.

* * * * *